United States Patent
Nayebi

(10) Patent No.: US 6,909,514 B2
(45) Date of Patent: Jun. 21, 2005

(54) WHEEL PROFILE INSPECTION APPARATUS AND METHOD

(75) Inventor: Kambiz Nayebi, Alpharetta, GA (US)

(73) Assignee: Beena Vision Systems, Inc., Atlanta, GA (US)

( * ) Notice: Subject to any disclaimer, the term of this patent is extended or adjusted under 35 U.S.C. 154(b) by 388 days.

(21) Appl. No.: 10/298,703

(22) Filed: Nov. 18, 2002

(65) Prior Publication Data

US 2004/0095585 A1 May 20, 2004

(51) Int. Cl.[7] .............................................. G01N 21/00
(52) U.S. Cl. ................................... 356/601; 356/237.2
(58) Field of Search ................................ 356/601–613, 356/237.1–237.2, 445–448; 250/559.23, 559.22, 559.24; 382/108

(56) References Cited

U.S. PATENT DOCUMENTS

| | | |
|---|---|---|
| 3,782,185 A | 1/1974 | Hassenauer et al. |
| 4,432,229 A | 2/1984 | Nowogrodzki |
| 4,674,869 A | 6/1987 | Pryor et al. |
| 4,679,447 A | 7/1987 | Sieradzki et al. |
| 4,749,870 A | 6/1988 | Schmalfuss et al. |
| 4,798,963 A | 1/1989 | Wittkopp et al. |
| 4,798,964 A | 1/1989 | Schmalfuss et al. |
| 4,802,285 A | 2/1989 | Ligacz et al. |
| 4,932,784 A | 6/1990 | Danneskiold-Samsoe |
| 5,247,338 A | 9/1993 | Danneskiold-Samsoe et al. |
| 5,555,632 A | 9/1996 | Naumann et al. |
| 5,574,233 A | 11/1996 | Oliver et al. |
| 5,636,026 A | 6/1997 | Mian et al. |
| 5,793,492 A | 8/1998 | Vanaki |
| 5,936,737 A * | 8/1999 | Naumann .................... 356/613 |
| 6,233,050 B1 | 5/2001 | Lopez Gomez et al. |
| 6,768,551 B2 * | 7/2004 | Mian et al. ................. 356/446 |
| 2003/0072001 A1 * | 4/2003 | Mian et al. ................. 356/446 |

FOREIGN PATENT DOCUMENTS

| | | |
|---|---|---|
| EP | 0 212 052 | 9/1991 |
| EP | 0 228 500 | 10/1992 |
| EP | 0 708 308 | 4/1996 |
| EP | 0 985 904 | 3/2000 |

OTHER PUBLICATIONS

Gage et al., "Evaluatio Results for Nayebi Wheel Profile Measurement System," Technology Digest, Timely Technology Transfer—01–024, 4 pages, Nov. 2001—Revised Jan. 16, 2002.

* cited by examiner

Primary Examiner—Michael P. Stafira
(74) Attorney, Agent, or Firm—McDonnell Boehnen Hulbert & Berghoff LLP

(57) ABSTRACT

A method and system for measuring railroad wheels, where the wheels may be measured while mounted on railcars that are in motion. The method and system may be practiced by using one or more lasers or other light sources to illuminate portions of the surface of the railroad wheels, two or more of which may be substantially mutually orthogonal. By converting images of the illuminated portions to coordinates, wheel center position and diameter can be calculated, and once center position and diameter are calculated, wheel profile parameters such as flange height, flange width, and tread hollow can be calculated. The method and system produces accurate results at speeds up to at least 60 miles per hour.

27 Claims, 8 Drawing Sheets

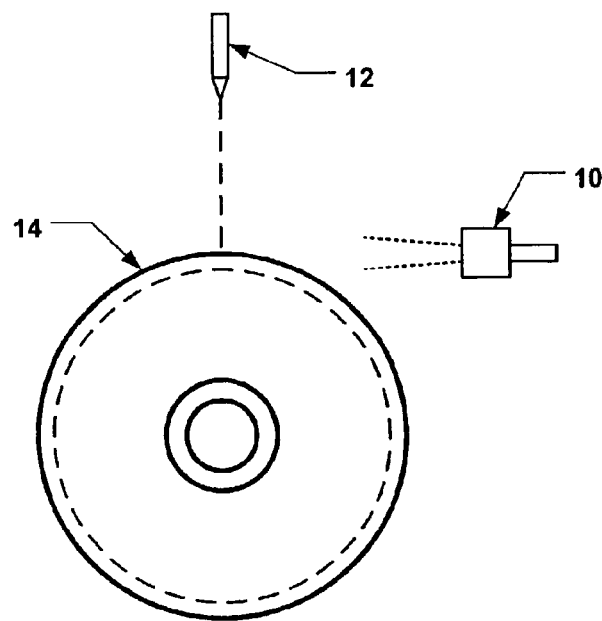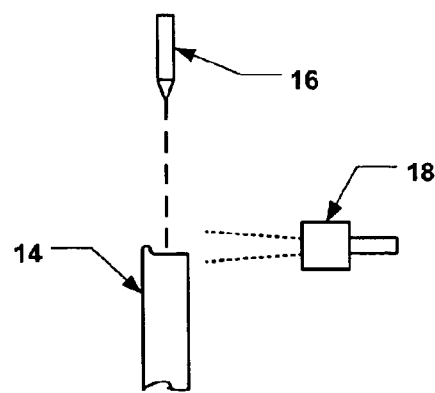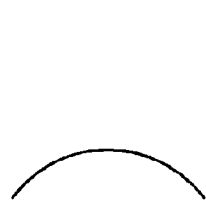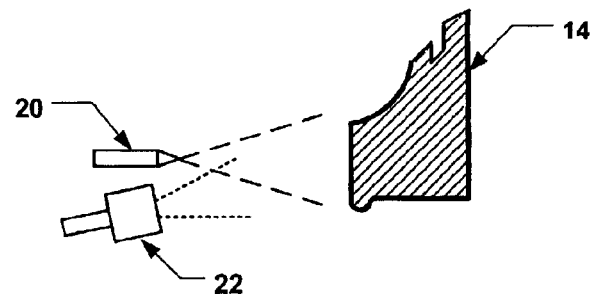
Fig. 2
Fig. 3A
Fig. 3B
Fig. 4

WHEEL PROFILE INSPECTION APPARATUS AND METHOD

BACKGROUND

1. Technical Field of the Invention

The present system relates to the measurement of wheel profiles and, more particularly, a non-contact method and apparatus capable of measuring wheel profiles while a train is in motion.

2. General Background

Large railroad operators, out of necessity, spend a considerable amount of time and money inspecting, repairing, and replacing railroad wheels. The inability to easily, accurately, and quickly identify and correct wheel problems is not only dangerous, since worn wheels are a major cause of derailments, but can also be costly due to the interruption of normal railroad operations while wheels are inspected and condemnable wheels (i.e., wheels with profiles that are out of tolerances) are replaced.

Regardless of the importance of identifying wheel problems, only about 5 percent of the railcar wheels in North America are fully inspected annually, due to the current difficulties in measuring profiles (such as manual use of gauges while a train is stopped).

Machine vision systems are one solution to the problem, because they can potentially enable automatic wayside profile measurements to be made as trains pass, without disrupting the normal operation of a railroad. In practice, however, machine vision systems have had limitations. For example, U.S. Pat. No. 5,793,492 (Vanaki) discloses a system that uses four "gage points" to estimate wheel circumference. The gage points Vanaki uses, however, are not points on the working surface of the wheel, so the system is incapable of determining the real working diameter of the wheel, and is also incapable of determining tread hollow, which is a critical indicator of condemnable wheels.

Another document, U.S. Pat. No. 5,247,338, discloses a contactless measurement system that requires advance knowledge of wheel size, stored in a database. The '338 patent requires wheel size data to be communicated to the measurement system prior to wheel measurement. Since the working diameter of wheels is not directly measured by the '338 patent's system, tread hollow cannot be accurately determined, and further, the system is adversely affected by variations in the vertical deflection of wheels due to different weight loads.

Bright ambient light can also present problems for some machine vision systems that rely on projected light to make measurements. A further limitation of some machine vision systems is the requirement that the relative positions of cameras and light sources must be set up precisely to ensure accurate results, which in turn requires time-consuming manual calibration. Another source of error of some systems is the relative position of the cameras and light sources with respect to the wheels when images are captured.

It would, therefore, be desirable to have an improved machine vision system that can make accurate, automatic measurements.

SUMMARY

In one aspect, a method for measuring a railroad wheel is disclosed. The railroad wheel may have a tread, a surface, a flange, an axis, and a profile. The method includes the steps of illuminating a first portion of the surface of the railroad wheel, the first portion being illuminated along a first plane intersecting the profile, and illuminating a second portion of the surface of the railroad wheel, the second portion being illuminated along a second plane, the second plane being substantially perpendicular to the axis of the railroad wheel. A third portion of the wheel is also illuminated from the flange side, providing a reference from which the tape line can be determined.

The method may further include capturing an image of the first portion, the second portion, and the third portion and converting the images to three sets of coordinates. Using the three sets of coordinates, the wheel center and wheel size (the wheel size being related to wheel diameter) can be calculated. Further, once wheel center and size are known, a set of wheel parameters can be calculated. The set of wheel parameters can include tread hollow, flange height, flange thickness, and other parameters.

In another aspect, a measurement system for optically measuring a railroad wheel is provided. The system can include a light source that illuminates a first portion of the surface of the railroad wheel, the first portion being illuminated along a first plane intersecting the profile. The system can also include a second light source that illuminates a second portion of the surface of the railroad wheel, the second portion being illuminated along a second plane, the second plane being substantially perpendicular to the axis of the railroad wheel. The first plane and the second plane may be substantially orthogonal to each other. The system can also include a third light source that illuminates a third portion of the surface of the railroad wheel along a plane substantially parallel to the axis of the wheel. The third portion is on the flange side of the wheel.

The system can further include one or more cameras aligned to capture images of illuminated portions, and also a computer for converting the images to sets of coordinates. The computer (or a separate computer) can also calculate, using the coordinates, a center and a wheel size of the railroad wheel, wheel size being related to wheel diameter, and the computer can further calculate a set of wheel parameters using the first and third sets of coordinates and using the calculated center and the calculated wheel size.

BRIEF DESCRIPTION OF THE DRAWINGS

The presently preferred embodiments are described herein with reference to the drawings, in which:

FIG. 2 illustrates the positional relationship of a light source and camera that may be used to measure wheel profiles;

FIG. 3 illustrates the positional relationship of a light source and camera that may be used to measure wheel size;

FIG. 4 illustrates a calibration gage that may be used to calibrate the system;

DESCRIPTION

As mentioned above, performing maintenance that is neither too late nor too soon on railroad wheels can save significant amounts of money, and may even save lives. A system that makes accurate measurements of wheel parameters such as tread hollow, flange height, and flange thickness, for example, is necessary to best determine when wheels require maintenance. Making such accurate measurements could require wheels to be removed from railcars or, at the least, could require that trains be stopped. Machine vision systems could, in theory, obviate these shortcomings, but in practice, presently known machine vision systems have limitations that prevent accurate measurements in bright sunlight and at high speeds or varying loads. Further, some machine vision systems require specially modified rail sections, and may require that some assumptions (which may be detrimental to accuracy) about wheel circumference be made.

A machine vision system in accordance with the preferred embodiments, however, allows accurate, automatic measurements to be made, substantially independent of train speed or wheel load. In a preferred embodiment, the system may be easily and quickly set up without special track sections, and does not use estimated wheel size, nor does it rely on precise wheel position. In addition, the system is relatively unaffected even by bright ambient light. The system is capable of measuring all wheels of a train while it is going at least about 60 miles per hour.

Figure 1:
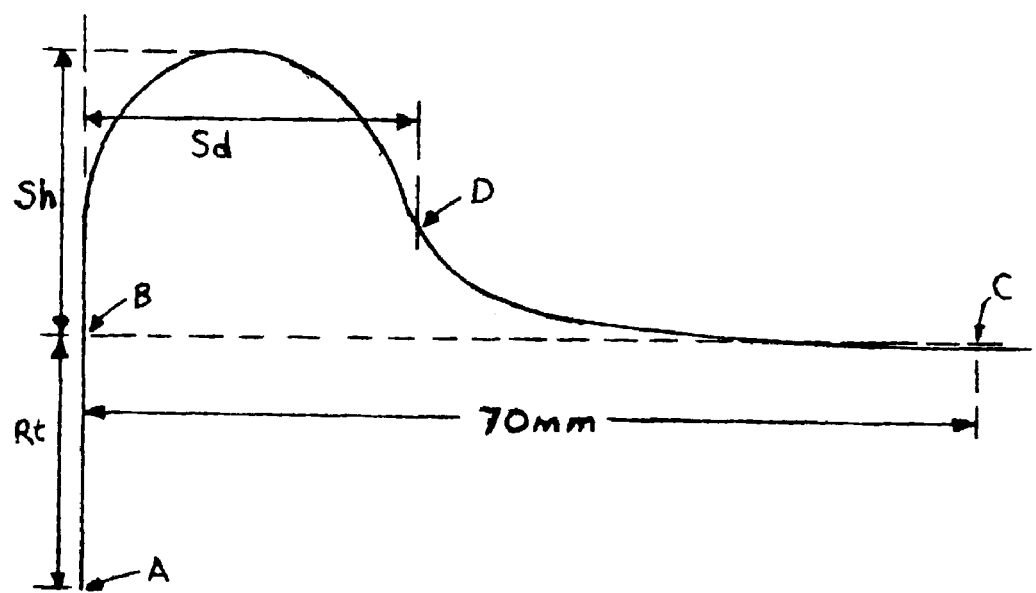
FIG. 1 illustrates a profile of a railroad wheel.

Referring now to the drawings, FIG. 1 illustrates the profile of a railroad wheel. As used herein, a profile means a cross-section of the working surface of a railroad wheel. Ideally, a wheel profile represents a cross-section taken at a plane that is parallel to and that includes a wheel's axis. The working surface can include the flange and the tread. If a wheel's profile is accurately known, standard parameters as defined by the Association of American Railroads, including (but not necessarily limited to) flange height (Sh), flange width (Sd), flange slope, wheel width, rim thickness (Rt), wheel size, and tread hollow (Hd), can be measured and recorded. Flange thickness, height, and rint thickness are measured using the tape line point, 70 mm from the flange (illustrated by point C). Flange height is the difference between radii of two circles, one that passes through point C, and another that passes through the head of the flange as shown, where the center of each circle is taken along the wheel's axis. Similarly, rim thickness Rt is defined as the difference between radii of two circles, one that passes through point C, and another that passes through the end of the wheel's rim at point A as shown, where the center of each circle is taken along the wheel's axis. Flange width, Sd, is measured as the horizontal distance between the end of the wheel, along line AB, and the flange thickness point D 10 mm above point C.

Tread hollow can be determined after the tread profile is reconstructed as described below. If the tread curve is a monotonically decreasing function of x from the flange side to the end of the wheel at the tread side (referring to FIG. 1), there is no hollowing. Conversely, there is tread hollowing if the curve is not a monotonically decreasing function of x, and the amount of tread hollowing is the difference between the local minimum point (close to the tape line) and the local maximum point of the profile.

Since the wheel profile cannot be measured directly as desired when the wheel is moving, compensation for the non-ideal measurement can be made after the actual measurement is done. For example, a profile that is skewed in one or more directions (due to inherent limitations of measuring apparatus) can be used as long as the skew is compensated for.

The profile of a wheel as shown in FIG. 1 can be accurately determined by using structured light to create an image from which dimensions can be obtained. Such an image can be captured with a CCD camera and further processed by one or more computers as digital image data. As an example, if a light beam is fanned out in the plane that includes (i.e., passes through) the wheel's axis as described above, and if the image that results from the intersection of the sheet of light with the profile surface of the wheel is captured by a camera, the captured image will be nearly in direct proportion to the wheel's profile.

An arrangement showing a nearly ideal relative positional relationship of a camera 10, a light source 12, and a railroad wheel 14 is shown in FIG. 2, as viewed from the flange side of railroad wheel 14. In the system of FIG. 2, the image created by structured light from light source 12 striking wheel 14, as produced by camera 10, would be substantially proportional to the profile of FIG. 1. As seen in FIG. 2, the light from light source 12 is viewed from the edge and so appears as a line, although the light is projected in a fan or sheet so as to produce the profile image shown in FIG. 1.

In real-world systems, especially those that can measure wheel parameters while wheels are mounted and moving, such an ideal positional relationship of light sources and cameras may be extremely difficult, if not impossible, to implement, for at least two reasons: First, the rail or parts of the wheel will usually obscure a light source, a camera, or both, since no light sources or cameras can be positioned in the path of travel of the wheel or any part of the train; and second, the wheel size may not be accurately known, due to wear and variations in wheel diameter. When wheel size is unknown, it is extremely difficult to ensure that light is projected in a plane that passes through the wheel's axis using a fixed light source. The significant advantages (such as environmentally controlled enclosures, lower vibration, reduced likelihood of damage from moving parts of trains, etc.) of placing all system components fairly low relative to the tops of the rails create a further limitation on component placement.

Regarding the wheel size variable, corrections can be made for off-center light sources and cameras if wheel size can be determined accurately. A light source and a camera that create a second image that is proportional to the circumference of the wheel can be used to measure wheel size. As an alternative, a single light source with cross-generating optics, rather than two separate sources, could be used to create both the wheel profile image and the second image.

FIG. 3A illustrates an ideally placed source and camera arrangement for measuring wheel size. Light source 16 as shown would project a fan or sheet of light edge-on to the viewer, so that camera 18, positioned so its axis is at a right angle to the sheet of light, would produce the image shown in FIG. 3B, excluding light from other sources. The image of FIG. 3B is substantially proportional to the circumference of wheel 14 and thus, when digitized, it can be used to calculate wheel size.

FIG. 4 illustrates a third laser and camera that may be used to measure rim thickness and to establish a reference for the tape line, point C in FIG. 1. As with FIGS. 2 and 3A, FIG. 4 shows a nearly ideal positional relationship between laser 20 and wheel 14. Laser 20 can project a vertical sheet of structured light that is perpendicular to the inner surface of wheel 14. Using the image captured by camera 22, rim end point A (as shown in FIG. 1) and some additional points along the profile of wheel 14 can be taken.

Because cameras and light sources of practical wheel measurement systems cannot be ideally positioned as described, compensation can be used to achieve accurate measurements in real-world coordinates.

System Calibration

Calibration of machine vision systems can be carried out in at least two ways: precise positioning of cameras and lasers (which can be used as light sources), or rough positioning of cameras and light sources, with further calibration performed on acquired images of calibration objects. The latter technique may be preferred because it obviates the need for time-consuming (and costly) system setup by trained personnel. Calibrating in software following rough positioning also allows for simple recalibration if for any reason the system loses calibration. The second calibration process includes camera calibration, laser plane parameter measurement, and calculating the transformation needed to convert image coordinates to real-world coordinates. Software calibration (that is, the second technique mentioned above) may comprise using a calibration object of known dimensions to generate an image. Then, since the object's position and dimensions are known, coordinates can be "mapped" to obtain a transformation or "mapping" to convert image coordinates to real-world coordinates. Finally, transformation parameters can be stored and subsequently used to convert any images acquired by the system to real-world coordinates.

Performing calibration using software mapping is a considerable advantage because all that is required is that lasers and cameras be set up in their approximate positions and then performing a calibration. Specifically, lasers or light sources can be set up first, and then cameras may be roughly positioned, the only requirements being that the cameras can acquire images of laser lines on a calibration object that is in position for measurement and that cameras and sources be in approximately the correct position to acquire wheel images. Because the present system is calibrated after system setup, even a significant deviation from the ideal positions shown in FIGS. 2 and 3A still allows accurate measurements to be made. For example, deviation from an ideal camera angle or laser angle of up to about 45° can still produce good measurement results. Thus, as used herein, the phrases "substantially parallel" and "substantially perpendicular" mean parallel or perpendicular within about ±45°.

As a first step of the calibration process, the cameras of the system should be calibrated. To illustrate, assume a pinhole camera as a model. A pinhole camera can be considered to be a device that maps 3-D objects to a two-dimensional image plane. This mapping can be defined by the following relationships between the "camera" coordinates (in an "XYZ" coordinate system) and the corresponding coordinates in the camera's image plane:

$$x_i = -\frac{f * x_c}{z_c} \quad (1A)$$

$$y_i = -\frac{f * y_c}{z_c} \quad (1B)$$

where f is the focal length of the camera and subscripts i indicate image plane coordinates, subscripts w indicate world coordinates, and subscripts c indicate camera coordinates.

Of course, where a camera is not positioned perfectly, camera coordinates will differ from "real-world" coordinates. In a practical system, a camera will likely not be perfectly positioned in all axes, so mapping will require a matrix multiplication that results in both a rotation and shift: $X_c P^* X_w$, or, in matrix form:

$$\begin{bmatrix} x_c \\ y_c \\ z_c \\ 1 \end{bmatrix} \begin{bmatrix} p_{11} & p_{12} & p_{13} & p_{14} \\ p_{21} & p_{22} & p_{23} & p_{24} \\ p_{31} & p_{32} & p_{33} & p_{34} \\ 0 & 0 & 0 & 1 \end{bmatrix} * \begin{bmatrix} x_w \\ y_w \\ z_w \\ 1 \end{bmatrix} \quad (2)$$

The equations for mapping between a real-world point and its image are thus:

$$x_i = \frac{-f(p_{11}x_w + p_{12}y_w + p_{13}z_w + p_{14})}{(p_{31}x_w + p_{32}y_w + p_{33}z_w + p_{34})} \quad (3A)$$

$$y_i = \frac{-f(p_{21}x_w + p_{22}y_w + p_{23}z_w + p_{24})}{(p_{31}x_w + p_{32}y_w + p_{33}z_w + p_{34})} \quad (3B)$$

Simplifying equations 3A and 3B yields:

$$x_i x_w p_{31} + x_i y_w p_{32} + x_i z_w p_{33} + x_i p_{34} + x_w f p_{11} + y_w f p_{12} + z_w f p_{13} + f p_{14} = 0 \quad (4A)$$

$$y_i x_w p_{31} + y_i y_w p_{32} + y_i z_w p_{33} + y_i p_{34} + x_w f p_{21} + y_w f p_{22} 30\ z_w f p_{23} + f p_{24} = 0 \quad (4B)$$

In addition to the foregoing calibrations, if a camera lens has significant radial distortion, parameters for radial distortion can be added to the calibration equations. A camera of the system can be calibrated by defining 6 or more real-world points I to m and acquiring an image of them with a camera in a known position to obtain the corresponding image points $(x_i, y_i), j=1,2, \ldots ,m$ and then solving for the unknown coefficients of matrix P using equations 4A and 4B, by, for example, using singular value decomposition (SVD). Other methods for solving equations 4A and 4B are also possible.

For maximum accuracy, the known real-world points (which can be defined on the surface of a special calibration gage) should, if possible, span the range of depths that will ultimately be measured, and should also lie in at least three different planes. This procedure can be performed using multiple cameras and a single calibration gage in a known position so that the multiple cameras can all be calibrated in one system of global coordinates. For example, two cameras (and two lasers) could be used to image the wheel profile, size, and position as described with reference to FIGS. 2 and 3A. A third camera and light source, used to generate a flange-side image as described with reference to FIG. 6, may also be calibrated in the same system of coordinates.

Figure 5:
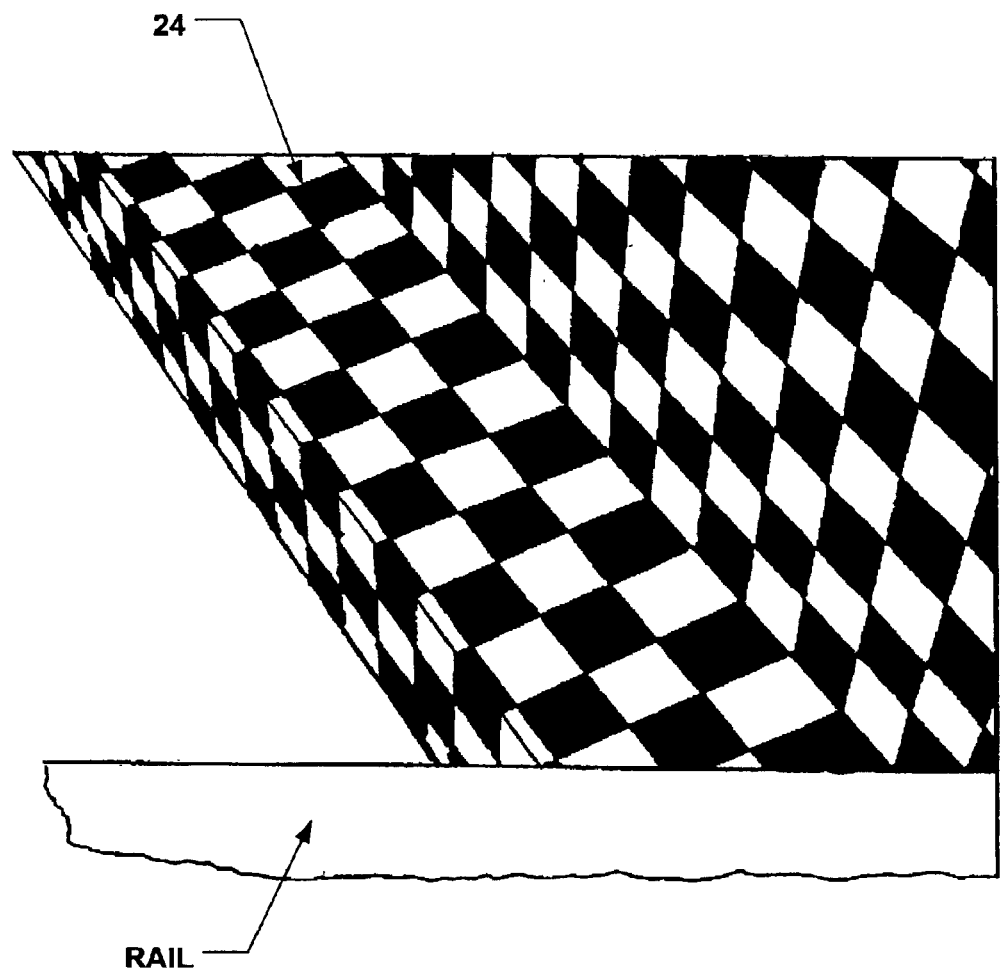
FIG. 5 illustrates a pattern of light striking the calibration gage to create a set of points that may be recorded by the system.

FIG. 5 shows a calibration gage 24 that may be used to calibrate the light sources and cameras of an embodiment. As shown, the calibration gage 24 may, for example, be in the form of a squared-off railroad wheel with a uniform checkerboard pattern or grid structure defined on each surface and continuing onto each adjacent surface. Each camera of the system can view at least three planes of such a gage when the gage is placed in its known position. The corners of the grids on the gage can be used to create two-dimensional rulers in each plane, which can in turn be used to calibrate the system. By using digital imaging algorithms for edge detection, and by using Hough transform algorithms, parameters a, b, and c of all lines ax+by+c=0 in view of the cameras—that is, all lines defined by grid corners of the calibration gage, can be mathematically determined. Using the known real-world coordinates of the gage's grid points input by an operator, the cameras can be calibrated as described above. The data input manually for calibration purposes can include:

Grid size—the size of each square grid on the calibration object in millimeters.

Region of interest—a rectangular area that contains the calibration points. The region of interest corresponds to the area in view of a camera that will be illuminated by a laser when wheels are in position for measurement.

Plane characteristic—each plane of the calibration object has one dimension, x, y, or z, defined as a constant.

Number of complete squares—each region of interest has a number of complete squares in each direction that can be used to determine the number of lines to be detected during calibration.

Region of interest coordinate origin—defines one corner of each region of interest as a reference point.

Direction of axis coordinate—defined as the correct direction of the coordinate system for each region of interest.

To carry out the camera calibration described above, the following steps may be performed:

1. Image resizing. Calibration images are resized to at least twice actual size using bicubic interpolation. This allows sub-pixel accuracy to be obtained, in turn decreasing errors in post-processing algorithms.

2. Determining the number of lines in the region of interest from the user input.

3. Adaptive edge detection. Extracts different edge lines in calibration images, returning edges where image gradients are at maximums.

4. Apply Hough Transform. A Hough Transform can be used to identify the parameters of lines defined by edge detection that best fit the points found, discounting the effect on calibration of points that are likely erroneous.

5. Determining intersection points of lines found.

6. Determining the world coordinates of the intersection points.

7. Extracting calibration data from the world coordinates and image coordinates of the intersection points.

The above steps are repeated for each region of interest on the calibration object. Further, substantially similar steps are performed to calibrate laser lines for each region of interest, but of course lines defined by the lasers' illumination of the calibration object rather than the object's grid are used.

After the system's cameras are calibrated, laser plane parameters can be similarly determined. As described above, structured light can be used in the system to illuminate portions of a wheel's surface. These illuminated portions substantially represent intersections of planes with various portions of the wheel surface, since the laser light is fanned out along one or more planes. One or more laser lines can be generated on a given surface. The use of multiple, parallel planes can be used to eliminate or reduce local deviations in the wheel surface. Laser planes can be modeled using the following equation:

$$ax_w + by_w + cz_w + d = 0 \quad (5)$$

where $$a^2 + b^2 + c^2 = 1 \quad (6)$$

For calibration of lasers, lasers can be projected onto the calibration gage 24 of FIG. 5 to create substantially straight lines where the light strikes planar gage surfaces. The light can be detected where it strikes a light portion of a grid on the gage, and the light may be absorbed where it strikes dark portions of a grid, resulting in substantially straight-line segments.

After filtering and image processing, a set of points that represents just the line segments on the gage surface can be extracted and used to obtain the laser plane parameters necessary for calibration. Since the position of the gage and the laser line is known and since the cameras have been calibrated, laser line parameters in real-world coordinates can be found. Then, applying equation (5) in AX=B form where $X=[x_w, y_w, z_w]^T$, $A=[a\ b\ c]$, and $B=-d$, parameters kA can be determined using the SVD method, where k is constant. Then, k can be determined by solving equation (6). Multiple laser lines can be calibrated using the foregoing procedure, although only one line is shown.

Once the camera and laser planes have been calibrated, any pixel or point $(x_w, y_w, z_w)$ that results from an intersection of a laser plane with an object can be determined in real-world coordinates by converting from image coordinates using the following system of equations, in combination with camera and laser plane calibration information:

$$x_w(x_i p_{31} + f p_{11}) + y_w$$
$$(x_i p_{32} + f p_{12}) + z_w(x_i p$$
$$_{33} + f p_{13}) = -(x_i p_{34} + f p_{14})$$
$$x_w(y_i p_{31} + f p_{21}) + y_w(x_i p$$
$$_{32} + f p_{22}) + z_w(y_i p_{33}$$
$$+ f p_{23}) = -(y_i p_{34} + f p_{24})$$
$$ax_w + by_w + cz_w = -d \quad (7)$$

Figure 6:
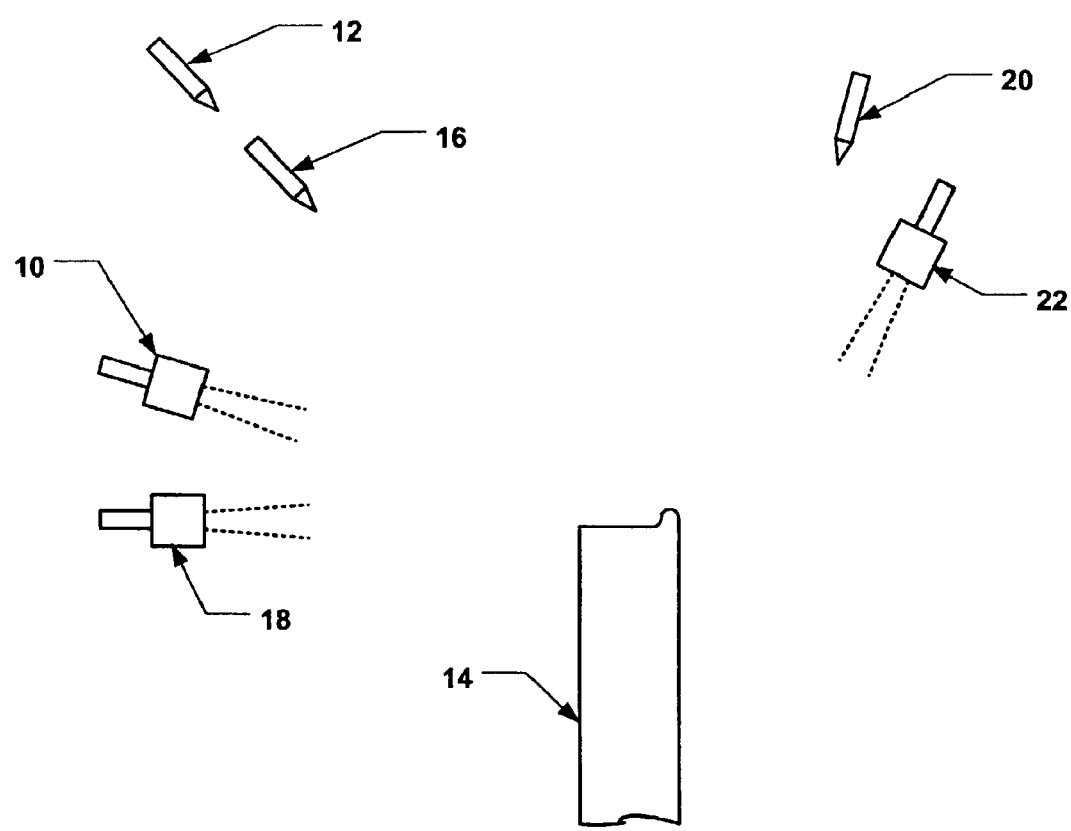
FIG. 6 is a top view of a railroad wheel and several light sources and cameras in position to make a measurement.

FIG. 6 is a top view of a railroad wheel 14 in position for measurement by a system in accordance with an embodiment, with lasers and cameras shown in their approximate positions. A similar set of components can be installed on each side of the track so that all wheels can be measured in a single pass.

Figure 7:
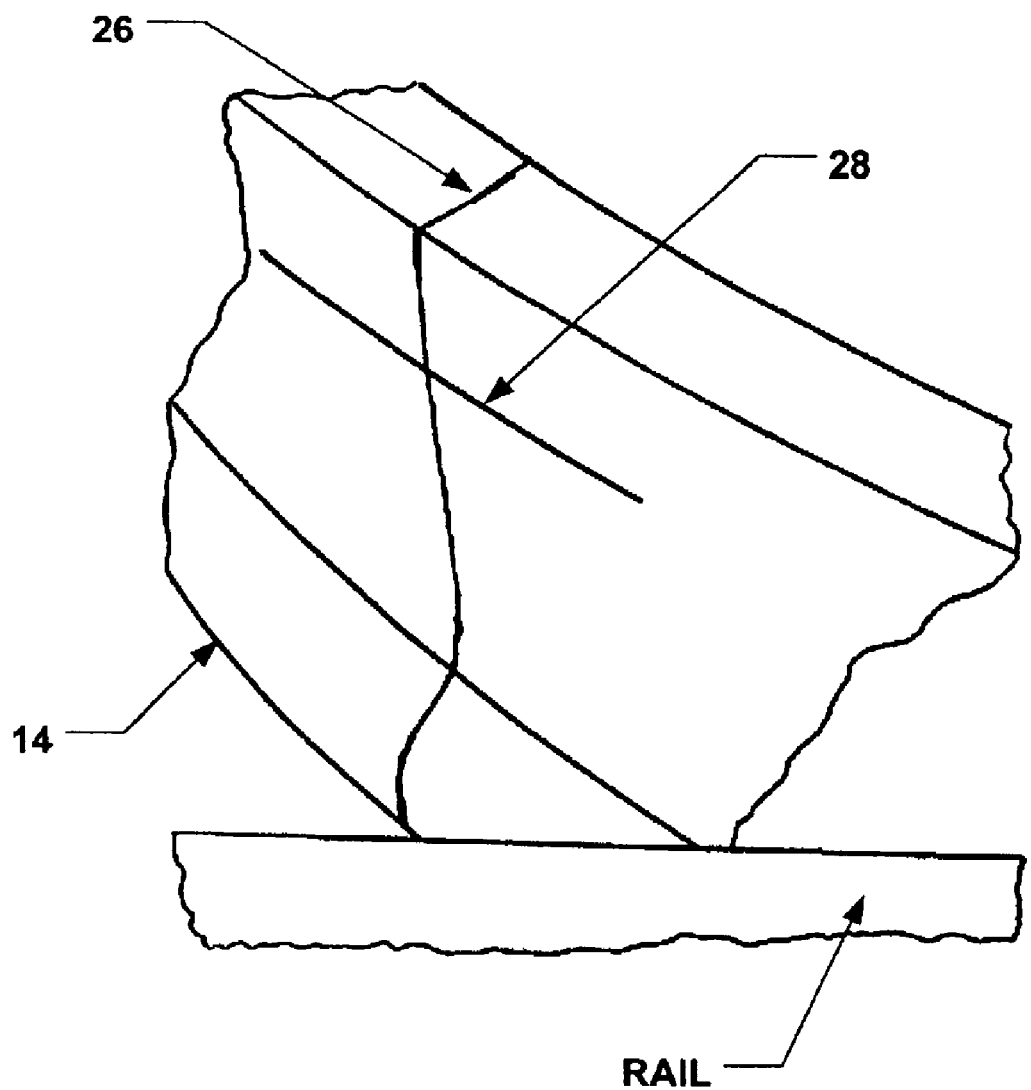
FIG. 7 is a perspective view of an image that can be produced by the system.

FIG. 7 is a perspective view of two laser lines that may be generated by lasers 12 and 16. Laser 16 may be used to illuminate a portion of the tread surface of wheel 14 along a plane that is substantially perpendicular to the axle of wheel 14, as shown by line 28 in FIG. 7. As described with reference to FIG. 3A, line 28 is substantially proportional to the circumference of the wheel at the tape line, and defines a relatively large percentage of the total circumference—in excess of 10%. This allows dozens of points to be used for estimating wheel size. Translating the points of this image allows for the calculation of the position of the center of the wheel in addition to the wheel size (i.e., diameter, radius, or circumference).

Laser 12 can similarly be used to illuminate the profile of wheel 14 along a plane that is substantially perpendicular to the surface at a point of intersection, shown by line 26 in FIG. 7. Again, however, it should be noted that laser 12 cannot be perfectly positioned for all cases, since the sizes of railroad wheels may vary. Laser 12 can produce an image that can be translated into world coordinates that can be used to measure the wheel's profile. Additional lasers (or additional lines generated by a single laser) can be used to eliminate or reduce the effect of local variations of wheels on system accuracy. For example, two or more measurements of a wheel may be made using laser lines that are spaced apart physically or in time, and the resulting sets of points created can be averaged or otherwise processed to increase accuracy. Commercially available lasers suitable for this system are those in the Magnum series of high-powered line generators, manufactured by Stocker & Yale of Canada.

Laser 20 can be used to illuminate the wheel from the flange side, allowing rim thickness to be measured. Laser 20 can produce an image (not shown) that is substantially proportional to the flange side of the profile of FIG. 1, thus establishing point A, the rim end point, of FIG. 1. Using point A, where line AB ends on the rim, rim thickness can be calculated as the difference between the radius of a circle passing through the taper line of the wheel and the radius of a circle passing through point A, with the wheel's axis at the center of both circles. It should be noted that a third laser such as laser 20 is not necessarily critical to all embodiments described; for example, at least wheel diameter and tread hollow can be measured without using laser 20.

The image generated by laser 20 can be captured by camera 22. Camera 10 may be used to record the image produced by laser 16, and another camera, camera 18, can be used to capture the image produced by laser 12. Cameras 22, 10, and 18 may be high-speed, resettable, progressive scan, monochrome machine-vision CCD cameras with electronic shutter speeds of up to 1/96,000 second, in order to capture fast-moving images. Maximum shutter speed will not always be necessary or desired, as greater image brightness may be achieved with slower speeds. Lenses with focal lengths in the range of 6–15 mm (typically 12 mm), and having good depth of field characteristics (ranging, e.g., from 10–20 cm) have been used with good effect. An example of just one suitable camera is Panasonic's GP-MF822 black and white machine vision camera. All cameras in the system (more or fewer than three could be used) can be substantially simultaneously triggered as described below, so that images can be converted to one set of real-world coordinates.

Narrowband optical filters (not shown) may be used with the cameras to improve the system's performance in direct sunlight and under other adverse lighting conditions. For example, filters having passband characteristics of 20 nm and about 80% passband gain, and having about 40 dB stop-band rejection, have been used successfully to reduce interference due to ambient light. Cameras used with such filters can create images where most of the observed (recorded) light is the light emitted from the laser sources.

Due to the high speed synchronized cameras and because laser 20 and camera 10 can be used to measure wheel size without regard to the exact position of a moving wheel, the system is largely unaffected by differences in rail deflection caused by heavier or lighter than normal loads, which is a problem in some prior art systems.

Figure 8:
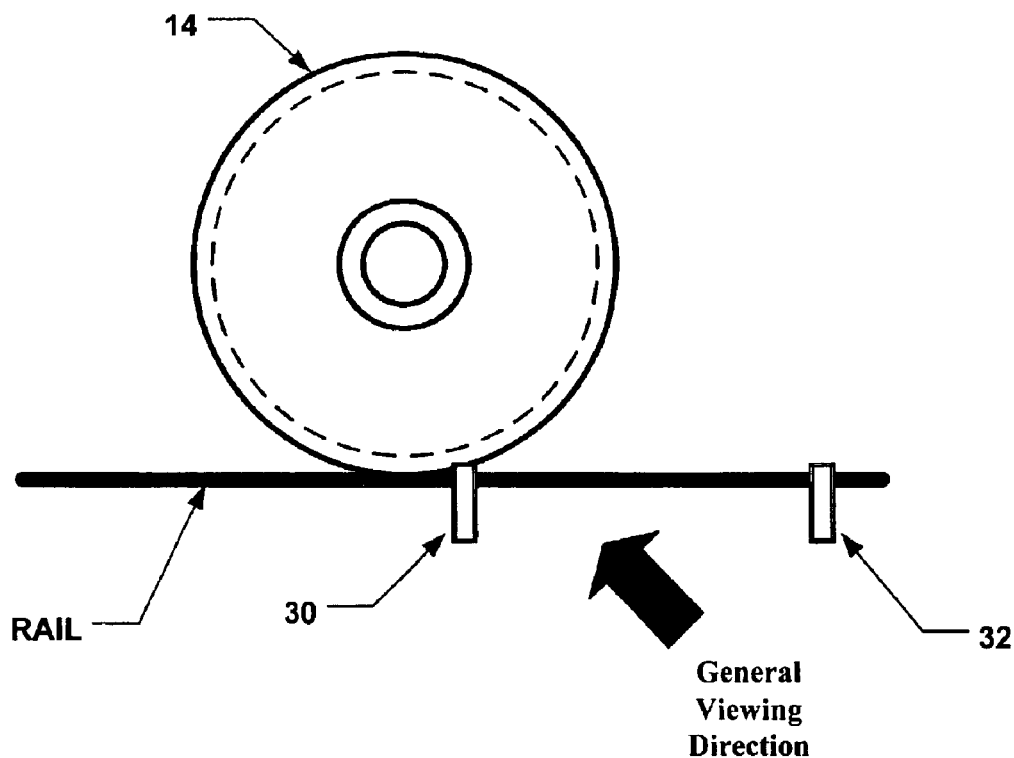
FIG. 8 illustrates a wheel in position to be measured and wheel position sensor placement.

FIG. 8 illustrates a pair of wheel proximity sensors 30 and 32 that may be used to detect a wheel 14 that is in position to be optically measured by the system. Omron's E3X-A41 and E32-DC200 are commercially available sensors that may be used. Sensors 30 and 32 may be mounted above the level of the rail, or they may be mounted below rail level and angled upward. Additional sensors (not shown) can be used to activate the system; such sensors may be placed from 50 to 200 yards from the measurement system itself, in either direction. Sensors 30 and 32 (as well as the activation sensors) may be optical sensors, such as infrared sensors, but this is no necessarily critical to all embodiments of the system. For example, inductive, non-infrared optical, or mechanical proximity sensors could also be used. Sensors 30 and 32 should be adjusted to detect objects at a distance between 150 and 400 mm, typically about 300 mm. Other distances may alternatively be used.

If the wheel is moving from left to right in FIG. 8, image capture should be triggered by the leading edge produced by sensor 30. If the wheel is moving from right to left, image capture should be triggered by the falling edge produced by sensor 30 after the wheel is detected by sensor 32. This triggering system allows wheel images to be captured when wheels are in approximately the same position regardless of direction of travel. Proximity signals are generated by the sensors, and the described position detection logic can be derived from the proximity signals for producing the trigger for a frame grabber and to reset the cameras so that all images are acquired substantially simultaneously. Accordingly, sensors 30 and 32 should have a response time of about 1 ms or faster.

Figure 9:
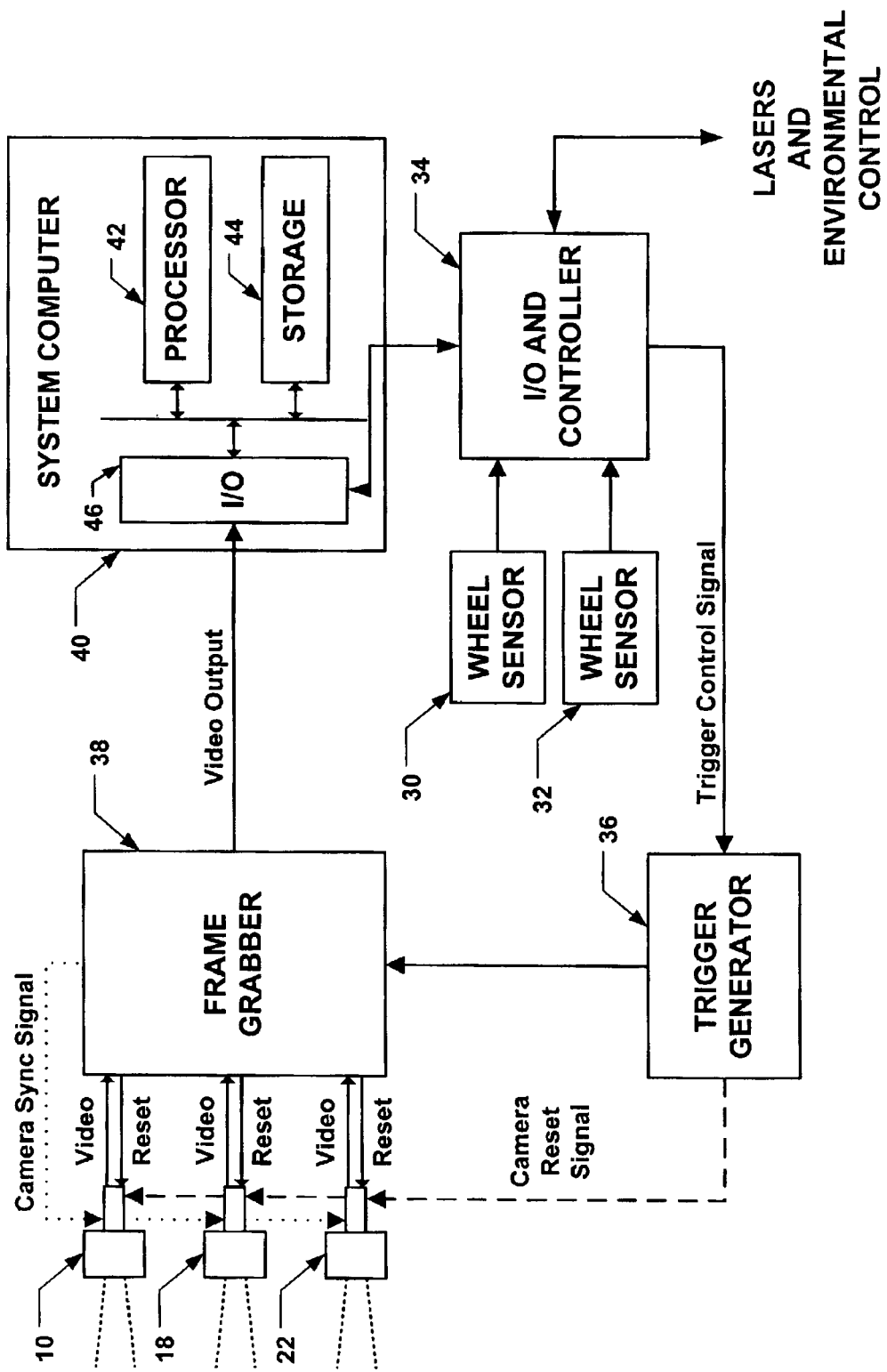
FIG. 9 is a block diagram of various components and functions of the system.

FIG. 9 is a block diagram that illustrates various functions and components that may be used to control the system and process camera images as described herein. The elements shown may be located within the environmental enclosure or elsewhere, and functions and components shown within individual blocks may be implemented in combinations and locations other than those shown. Input/output (I/O) and system controller 34 processes inputs to and outputs from the system. For example, the system may be activated by sensors (not shown) located some distance away from the measurement point as described above. Once activated, I/O 34 can apply power to cameras, lasers, and position sensors. I/O 34 can receive input signals from wheel sensors 30 and 32 and generate a trigger control signal as described when a wheel is in position to be measured. I/O 34 can also receive environmental inputs and generate appropriate outputs to control the system's enclosure or enclosures. A trigger control signal from I/O 34 can be provided to trigger generator 36 which can in turn provide a camera reset signal to cameras 10, 18, and 22, and can also provide a trigger signal to frame grabber 38.

The frame grabber 38 captures camera output signals and converts them to digital images that can be stored for further processing. The frame grabber serves as the master synchronization signal generator for all cameras; it should also be capable of receiving an output sync signal from one of the cameras and providing a sync signal to all cameras. The frame grabber should also be capable of grabbing single frame or field signals from any CCD source. The Matrox Meteor II/multi-channel frame grabber is one commercially available frame grabber suitable for use with the present system. If the cameras used are monochrome, monochrome frame grabber inputs are adequate. Color cameras and frame grabbers may also be used, but are more expensive and do not provide a commensurate improvement in system performance.

The system may also include a system computer 40 interconnected to I/O 34 and frame grabber 38. System computer 40 can also be in communication with one or more networks to provide measurement results to a railroad operator. System computer 40 may include a processor 42 and storage 44, and interface 46, among other components; processor 42, storage 44, and interface 46 may be interconnected by a system bus 48. System computer 40 may be an IBM-compatible personal computer or a Macintosh computer running any suitable operating system such as Windows, Linux, or MacOS, for example, and it may be located remotely or within the environmental enclosure of the system. Other computers may alternatively be used.

Once calibration has been performed by processor 42 using executable routines and data in storage 44, wheel measurements can be made as wheels pass the measurement point as described above. Image data acquired by the system can be stored in storage 44 for later processing by processor 42, or processing of the data can begin as soon as images are acquired. The system is capable of processing data for every wheel on passing trains and transmitting critical wheel parameters to remote systems via interface 46. Alternatively, data could be stored locally and recovered or analyzed any time after measurements are made.

Wheel measurements stored locally or remotely in a database can be used for offline statistical analysis, data trending, predicting wear rate, scheduling maintenance, etc.

Wheel Image Processing

After wheel images are acquired as described above, they can be processed as follows to extract data that can be used to determine wear and also to determine if wheels should be replaced. The processing can be carried out by processor 42 executing a routine or routines in storage 44.

Generally, points defining wheel surfaces illuminated by lasers are extracted from camera images. The following steps can be used to detect laser line images of wheels:

Resize images (2×or more) to achieve sub-pixel accuracy;
Detect edge points using an adaptive edge-detection algorithm;
Dilate edge detected image;
Find histogram of labeled points in original image;
Find adaptive threshold for histogram;
Segment original image using the adaptive threshold;
Thin the segmented image;
Extract laser points using thinned image;
Reject noise points;
Grow and merge remaining points; and
Save points for post-processing.

Each of these steps may be carried out for each camera in the system.

Wheel Profile Reconstruction

Once the points of wheel images as described above are available, they can be used, along with calibration data, to reconstruct wheel parameters in world coordinates. As a first step, equation 7 above can be solved for points derived from two or more cameras to define the wheel surface in world coordinates. To extract wheel profile parameters, the distance from the wheel's axis to each point on the profile surface of the wheel can be used. This requires determination of the wheel's size and the location of its axis, which can be done, for example, using the points defined by line 28 in FIG. 7. Since wheel radius will typically vary by less than 10 mm along the width of the tread, a simplified equation, which models the tread as a cylinder, as follows, can be used to extract the necessary parameters:

$$(y-y_0)^2+(z-z_0)^2=r^2 \qquad (8)$$

Equation 8 represents a circle whose axis passes through $z_0$, $y_0$, and it can be solved with any three points to calculate the center and the radius, but accuracy can be improved by using all the extracted points of line 28, as provided by the extraction process described above. Some error will exist when multiple points from a real-world system are used, but the effects of erroneous or "noise" points can be minimized by using a least-mean square optimization.

Thus, by converting sets of points of images created by laser lines on the surface of a railroad wheel to real-world coordinates using image extraction and calibration data, profile measurements can be accurately made, even for moving railroad wheels.

Similarly, rim thickness can be reconstructed using the image generated by laser 20 and camera 22 in addition to the reconstructed profile. Rim end point, point A, is simply the point where the line generated by laser 20 ends. Since the wheel's reconstructed profile includes the tape line (point C of FIG. 1), rim thickness can be calculated by subtracting the distance from the axis to point A from the distance of point C to the axis.

Because deviations of up to 45° are possible while still allowing accurate measurements to be made, all the cameras and lasers shown in FIG. 6 can be mounted below the top of the rail, although this is not a requirement. This, in turn, allows the components to be installed in a ruggedized, environmentally controlled enclosure. Such an enclosure can be mounted using a vibration-isolating structure or material, such as Teflon, atop a concrete base. The enclosure may be air-conditioned to maintain humidity at less than 90%, and to limit temperature to between about 14° F. and about 104° F. The enclosures on either side of the rail may be interconnected by a pipe, allowing one environmental control system to be used.

Figure 10:
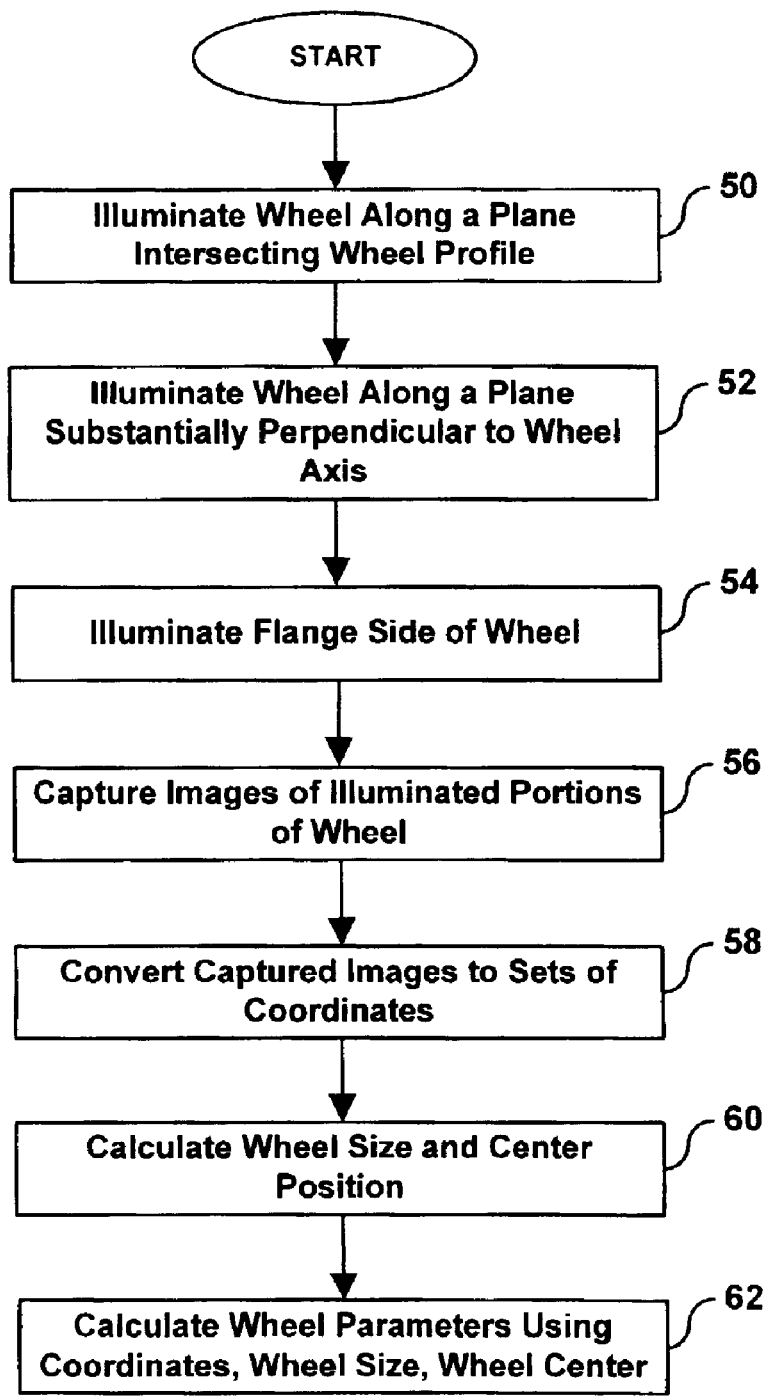
FIG. 10 is a flow diagram illustrating a method of operating embodiments of the system.

FIG. 10 is a flow diagram illustrating a method of operating some embodiments of the system. At step 50, a wheel to be measured is illuminated along a plane that intersects the wheel's profile. At step 52, the wheel is illuminated along a plane that is substantially perpendicular to the wheel's axis—that is, in a plane that approximately intersects the circumference of the wheel's working surface. At step 54, the flange side of the wheel is illuminated along a plane such that the illuminated section can be used to establish the flange side of the profile of FIG. 1. At step 56, images of the illuminated wheel portions of steps 50 through 54 can be captured substantially simultaneously as described above. The illuminated portions that result from steps 50 and 52 are best shown in FIG. 7, and the portion illuminated at step 54 is best illustrated by the portion that would result from the laser and camera setup shown in FIG. 4.

Next, as shown at step 58, the captured images are converted to sets of coordinates as described above, with at least one set representing the wheel's profile and another set representing the wheel's circumference. Calibration data can be used in converting the images to coordinates for improved accuracy. At step 60, the wheel size and position is calculated, which enables further calculation of wheel profile parameters, as shown at step 62. As shown at step 62, however, some wheel parameters can be calculated solely using the set of points extracted from the illumination of step 50, without use of points representing wheel size and position.

Presently preferred embodiments of the present system have been illustrated and described. It will be understood, however, that changes and modifications may be made to system described without deviating from the spirit and scope of the invention, as defined by the following claims.

I claim:

1. A method for measuring a railroad wheel, the railroad wheel having a tread, a surface, a flange, an axis, and a profile, the method comprising:

illuminating a first portion of the surface of the railroad wheel, the first portion being illuminated along a first plane intersecting the profile;

illuminating a second portion of the surface of the railroad wheel, the second portion being illuminated along a second plane intersecting the railroad wheel, the second plane being substantially perpendicular to the axis of the railroad wheel;

capturing a first image of the first portion;

capturing a second image of the second portion;

converting the first image to a first set of coordinates;

converting the second image to a second set of coordinates;

calculating, using the second set of coordinates, a center and a wheel size of the railroad wheel, the wheel size being related to a wheel diameter; and calculating a set of wheel parameters using the first set of coordinates, the calculated center, and the calculated wheel size.

2. The method of claim 1, wherein the set of wheel parameters comprises tread hollow.

3. The method of claim 2, wherein the set of wheel parameters further comprises wheel size.

4. The method of claim 1, further comprising:
illuminating a third portion of the surface of the railroad wheel, the third portion being illuminated along a third plane intersecting the flange side of the railroad wheel and being substantially parallel to the axis of the railroad wheel;
capturing a third image of the third portion;
converting the third image to a third set of coordinates; and
calculating, using the first set of coordinates, the second set of coordinates, and the third set of coordinates, a set of wheel parameters.

5. The method of claim 4, wherein the set of wheel parameters includes a rim thickness of the railroad wheel.

6. The method of claim 4, wherein the first portion, the second portion and the third portion are illuminated with lasers.

7. The method of claim 4, further comprising:
filtering the light that comprises the first image the second image, and the third image so that the first image, the second image, and the third image each respectively comprise substantially only the first illuminated portion, the second illuminated portion, and the third illuminated portion.

8. The method of claim 5, further comprising:
filtering the light that comprises the first image the second image, and the third image so that the first image the second image, and the third image each respectively comprise substantially only the first illuminated portion, the second illuminated portion, and the third illuminated portion.

9. The method of claim 4, wherein the set of wheel parameters comprises flange height and flange thickness.

10. The method of claim 4, wherein the first plane is substantially perpendicular to the railroad wheel's tread surface at a point where the first plane intersects the tread surface, and wherein the first plane is substantially perpendicular to the second plane.

11. The method of claim 4, wherein converting the first image the second image, and the third image comprises using calibration data.

12. The method of claim 3, wherein the second plane intersects the railroad wheel substantially along a circumference of the railroad wheel's load bearing surface.

13. The method of claim 12, wherein the second portion includes more than about 10 percent of the railroad wheel's circumference.

14. The method of claim 5, further comprising resizing the captured images to achieve sub-pixel accuracy.

15. A method for measuring a railroad wheel while the wheel is mounted on a railcar that is in motion on a rail, the railroad wheel having a tread, a surface, a flange, an axis, and a profile, the method comprising:
using a laser to illuminate a first portion of the surface of the railroad wheel, the first portion being illuminated along a first plane intersecting the profile;
using a laser to illuminate a second portion of the surface of the railroad wheel, the second portion being illuminated along a second plane intersecting the railroad wheel, the second plane being substantially perpendicular to the axis of the railroad wheel;
capturing a first image of the first portion;
capturing a second image of the second portion;
filtering the light that comprises the first image and the second image so that the first image and the second image each respectively comprise substantially only the first illuminated portion and the second illuminated portion;
converting the first image to a first set of coordinates;
converting the second image to a second set of coordinates;
calculating, using the second set of coordinates, a center and a wheel size of the railroad wheel, wheel size being related to a wheel diameter of the railroad wheel; and
calculating a set of wheel parameters using the first set of coordinates, the calculated center, and the calculated wheel size, wherein the set of wheel parameters comprises tread hollow.

16. The method of claim 15, further comprising:
using a laser to illuminate a third portion of the surface of the railroad wheel, the third portion being illuminated along a third plane intersecting the flange side of the railroad wheel and being substantially parallel to the axis of the railroad wheel;
capturing a third image of the third portion;
converting the third image to a third set of coordinates; and
calculating, using the first set of coordinates, the second set of coordinates, and the third set of coordinates, a rim thickness, a flange height, and a flange thickness of the railroad wheel.

17. A measurement system for optically measuring a railroad wheel, the railroad wheel having a tread, a surface, a flange, an axis, a surface, and a profile, the system comprising:
a first optical means that illuminates a first portion of the surface of the railroad wheel, the first portion being illuminated along a first plane intersecting the profile;
a second optical means that illuminates a second portion of the surface of the railroad wheel, the second portion being illuminated along a second plane intersecting the railroad wheel, the second plane being substantially perpendicular to the axis of the railroad wheel, wherein the first plane and the second plane are substantially orthogonal to each other;
a first camera aligned to capture a first image of the first portion;
a second camera aligned to capture a second image of the second portion;
means for converting the first image to a first set of coordinates;
means for converting the second image to a second set of coordinates;
means for calculating, using the second set of coordinates, a center and a wheel size of the railroad wheel, wheel size being related to a wheel diameter;
means for calculating a set of wheel parameters using the first set of coordinates, the calculated center, and the calculated wheel size.

18. The system of claim 17, further comprising:
a light source that illuminates a third portion of the surface of the railroad wheel, the third portion being illuminated along a third plane intersecting the flange side of the railroad wheel and being substantially parallel to the axis of the railroad wheel;
a third camera aligned to capture a third image of the third portion;

means for converting the third image to a third set of coordinates; and means for calculating, using the first set of coordinates, the second set of coordinates, and the third set of coordinates, a rim thickness of the railroad wheel.

19. The measurement system of claim 17, wherein the first optical means and the second optical means comprise a single laser and cross generation optics.

20. The measurement system of claim 17, wherein the first plane is substantially perpendicular to the railroad wheel's tread surface at a point where the first plane intersects the tread surface.

21. A measurement system for optically measuring a railroad wheel, the railroad wheel having a tread, a surface, a flange, an axis, and a profile, the system comprising:

a first laser that illuminates a first portion of the surface of the railroad wheel, the first portion being illuminated along a first plane intersecting the profile, the first plane being substantially perpendicular to the railroad wheel's tread surface at a point where the first plane intersects the tread surface;

a second laser that illuminates a second portion of the surface of the railroad wheel, the second portion being illuminated along a second plane intersecting the railroad wheel, the second plane being substantially perpendicular to the axis of the railroad wheel, wherein the first plane and the second plane are substantially orthogonal to each other;

a first camera aligned to capture a first image of the first portion;

a second camera aligned to capture a second image of the second portion; and a computer-readable medium comprising instructions executable by a processor to:
convert the first image to a first set of coordinates;
convert the second image to a second set of coordinates;
calculate, using the second set of coordinates, a center and a wheel size of the railroad wheel, wheel size being related to a wheel diameter; and
calculate a set of wheel parameters using the first set of coordinates, the calculated center, and the calculated wheel size.

22. The measurement system of claim 21, wherein the set of wheel parameters comprises tread hollow.

23. The measurement system of claim 21, further comprising:

a third laser that illuminates a third portion of the surface of the railroad wheel, the third portion being illuminated along a third plane intersecting the flange side of the railroad wheel and being substantially parallel to the axis of the railroad wheel;

a third camera aligned to capture a third image of the third portion; and wherein the computer readable medium includes further instructions to:
convert the third image to a third set of coordinates; and
calculate, using the first set of coordinates, the second set of coordinates, and the third set of coordinates, a set of wheel parameters.

24. The measurement system of claim 23, wherein the first camera, the second camera, and the third camera include filters that exclude substantially all light except for the light having the bandwidth of the first laser, the second laser, and the third laser, respectively.

25. The measurement system of claim 21, wherein the set of wheel parameters comprises tread hollow.

26. The measurement system of claim 23, wherein the set of wheel parameters comprises flange height and flange thickness.

27. A measurement system for measuring a railroad wheel while the wheel is mounted on a railcar that is in motion on a rail, the wheel having a tread, a flange an axis, a surface, and a profile, the measurement system comprising:

a first laser that illuminates a first portion of the surface of the railroad wheel, the first portion being illuminated along a first plane intersecting the profile, the first plane being substantially perpendicular to the railroad wheel's surface at a point where the first plane intersects the surface;

a second laser that illuminates a second portion of the surface of the railroad wheel, the second portion being illuminated along a second plane intersecting the railroad wheel, the second plane being substantially perpendicular to the axis of the railroad wheel, wherein the first plane and the second plane are substantially orthogonal to each other;

a third laser that illuminates a third portion of the surface of the railroad wheel, the third portion being illuminated along a third plane intersecting the flange side of the railroad wheel and being substantially parallel to the axis of the railroad wheel;

a first camera aligned to capture a first image of the first portion;

a second camera aligned to capture a second image of the second portion;

a third camera aligned to capture a third image of the third portion;

a plurality of wheel position sensors, the sensors being communicatively coupled to trigger the capture of the first image and the second image when the wheel is in a defined position relative to the first camera and the second camera, substantially without regard to the wheel's direction of travel; and a computer-readable medium comprising instructions executable by a processor to:
convert the first image to a first set of coordinates;
convert the second image to a second set of coordinates;
convert the third image to a third set of coordinates;
calculate, using the second set of coordinates, a center and a wheel size of the railroad wheel, wheel size being related to a wheel diameter; and
calculate a set of wheel parameters using the first set of coordinates, the third set of coordinates, the calculated center, and the calculated wheel size, wherein the set of wheel parameters comprises flange height, flange thickness, and tread hollow.

* * * * *